United States Patent
Reulein

(10) Patent No.: US 8,327,980 B2
(45) Date of Patent: Dec. 11, 2012

(54) WHEEL STUD SLEEVE FOR A CERAMIC BRAKE DISK

(75) Inventor: Harald Reulein, Megesheim (DE)

(73) Assignee: Audi AG, Ingolstadt (DE)

( * ) Notice: Subject to any disclaimer, the term of this patent is extended or adjusted under 35 U.S.C. 154(b) by 982 days.

(21) Appl. No.: 12/045,296

(22) Filed: Mar. 10, 2008

(65) Prior Publication Data

US 2009/0236190 A1  Sep. 24, 2009

(30) Foreign Application Priority Data

Mar. 9, 2007  (DE) .................... 10 2007 011 525

(51) Int. Cl.
*F16D 65/12* (2006.01)

(52) U.S. Cl. ............... 188/18 A; 188/218 XL; 411/353

(58) Field of Classification Search ................ 188/17, 188/18 A, 205 A, 206 A, 218 XL; 403/337; 411/38, 337, 338
See application file for complete search history.

(56) References Cited

U.S. PATENT DOCUMENTS

| | | | |
|---|---|---|---|
| 3,708,042 A * | 1/1973 | Krause et al. ............... 188/73.2 |
| 3,771,410 A * | 11/1973 | Swindt, II ..................... 411/338 |
| 4,049,085 A | 9/1977 | Blunier |
| 4,177,883 A * | 12/1979 | Margetts ................. 188/218 XL |
| 4,280,598 A * | 7/1981 | Pollinger ................ 188/218 XL |
| 4,595,324 A * | 6/1986 | Sadri ............................... 411/38 |
| 5,299,667 A | 4/1994 | Hammond |
| 6,139,215 A * | 10/2000 | Kuhne et al. .................. 403/337 |
| 6,227,783 B1 * | 5/2001 | Salameh ....................... 411/353 |
| 6,267,209 B1 * | 7/2001 | Gross et al. ............. 188/218 XL |
| 6,267,210 B1 * | 7/2001 | Burgoon et al. ........ 188/218 XL |
| 6,357,561 B2 | 3/2002 | Ruiz |
| 2001/0040076 A1 | 11/2001 | Gross et al. |

FOREIGN PATENT DOCUMENTS

| | | |
|---|---|---|
| DE | 0718521 | 6/1996 |
| DE | 103 21 795 | 1/2005 |
| DE | 103 21 795 B3 | 1/2005 |
| EP | 0 718 521 B1 | 6/1996 |
| EP | 1 013 956 | 6/2000 |
| EP | 1 013 956 A2 | 6/2000 |
| GB | 2 228 053 | 8/1990 |
| GB | 2 228 053 A | 8/1990 |

* cited by examiner

*Primary Examiner* — Christopher Schwartz
(74) *Attorney, Agent, or Firm* — Novak Druce + Quigg LLP

(57) ABSTRACT

A sleeve for holding a mounting stud in the bore of a ceramic brake disk wherein the sleeve is made of metal and is equipped on one side with a collar, that slip-proof and captive attachment is effected by a flange on the opposite sleeve end, and that neither the collar nor the flange projects over the boundary planes which form the surface of the ceramic brake disk perpendicular to the axis of the bore.

6 Claims, 1 Drawing Sheet

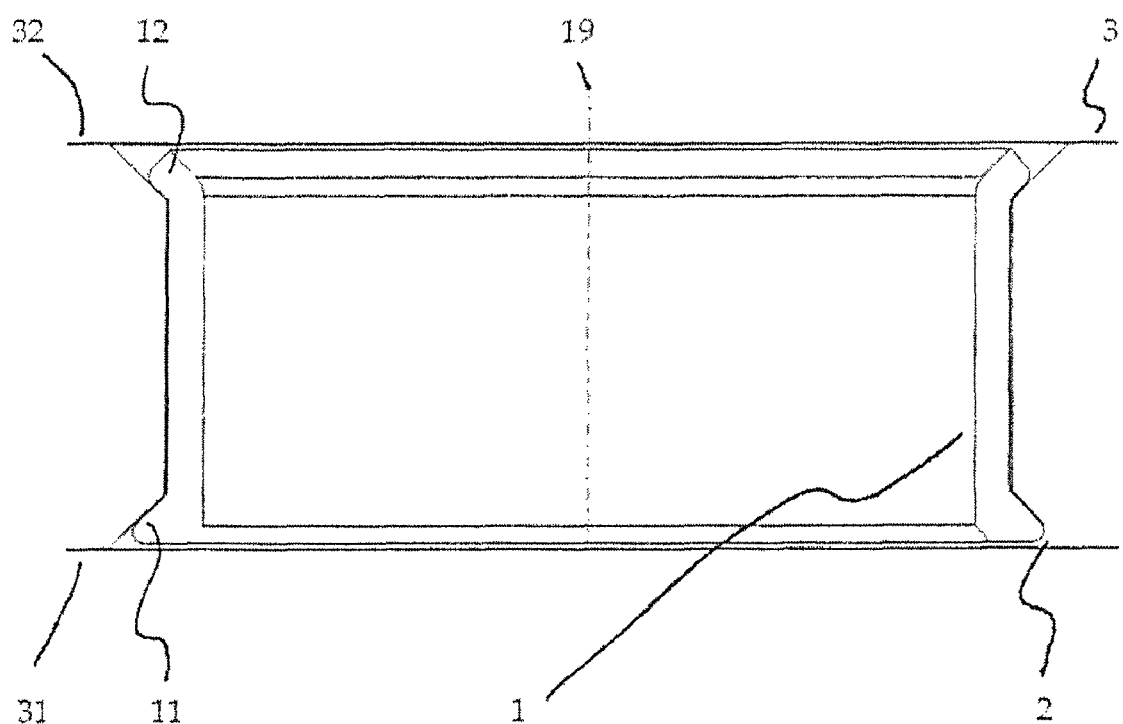

WHEEL STUD SLEEVE FOR A CERAMIC BRAKE DISK

CROSS-REFERENCE TO RELATED APPLICATIONS

This application claims priority from German Application No. 10 2007 011 525.5 filed Mar. 9, 2007, hereby incorporated by reference in its entirety.

The invention relates to a wheel stud sleeve for a ceramic brake disk, in particular a carbon-ceramic brake disk.

BACKGROUND OF THE INVENTION

Conventionally, carbon-ceramic brake disks are made in two parts, a ceramic, cylindrical ring-shaped friction ring being attached to a metallic chamber. The metallic chamber for its part is attached to a hub on the wheel shaft (wheel hub) using screw fittings.

This type of attachment is known for example from Patent Specification EP 0 718 521 B 1.

If a carbon-ceramic brake disk is made without a chamber, that is, attachment of the carbon-ceramic brake disk takes place directly to the wheel hub, and due to the mechanical properties of ceramic materials it is necessary to make the receiving holes for the wheel studs in the ceramic material such that the pressures which form in the attachment of the brake disk and in operation of the brakes and which act on the ceramic material are kept sufficiently low so that no damage to the ceramic material can occur.

SUMMARY OF THE INVENTION

The advantages achieved with this invention are especially the prevention of damage to the ceramic materials by preventing direct contact between the ceramic material and the threaded part of the mounting stud, and the associated protection of the ceramic material in operation and especially in dismounting of the brake disk. The pressure acting on the ceramic material is uniformly distributed onto the inner part of the bore or hole and thus is reduced to a value which is below the threshold of damage.

BRIEF DESCRIPTION OF THE DRAWING

FIG. 1 shows a section through a ceramic brake disk with a hole which is intended for accommodation of a mounting stud and with a sleeve inserted into the hole.

DETAILED DESCRIPTION OF PREFERRED EMBODIMENTS OF THE INVENTION

In particular, a sleeve 1 for holding a mounting stud in a hole 2 or bore of a ceramic brake disk 3 is shown, the sleeve 1 being made of metal and being equipped on one side with a collar 11, and slip-proof, captive attachment is effected by the flanging 12 on the opposite sleeve end, and neither the collar 11 nor the flanging 12 projecting over the boundary planes 31, 32 which form the surface of the ceramic brake disk 3 perpendicular to the axis 19 of the hole or bore.

By preference the axial distance between the sleeve collar 11 and the boundary plane 31 which forms the surface of the ceramic brake disk 3 perpendicular to the axis 19 of the hole or bore and between the flanging 12 and the boundary plane 32 which forms the surface of the ceramic brake disk 3 perpendicular to the axis 19 of the hole or bore each independently of one another is at least 0.1 mm and at most 0.5 mm.

The sleeve 1 is made symmetrical to the axis 19 of the hole 2 or the bore in the ceramic brake disk 3. The hole 2 is beveled toward the two surfaces 31, 32 of the ceramic brake disk 3, its being preferred that an angle of at most 45° to the surface 31, 32 is formed. Especially preferably the angle is between 30° and 42°, especially 35° to 40°. A flatter angle has proven especially effective for the ceramic materials considered here.

The wall thickness of the sleeve 1 is preferably at least 0.5 mm and preferably at most 3 mm.

The brake disks equipped with the sleeves according to the invention afford improved overall ease of braking. Due to the sleeves fixed on the disks the brake disks equipped in this way are easier to install than those with loose sleeves, the bores and holes are protected both in mounting and dismounting, and the distribution of the hole bearing pressure is more uniform than in a version with a loose sleeve.

The invention claimed is:

1. A sleeve for a ceramic brake disk attachable to the hub of an axle of a motor vehicle, said disk having a pair of outer planar surfaces and an opening therethrough provided with recessed end surfaces, comprising an annular member insertable in said disk opening for receiving a stud therethrough for attaching said disk to said hub, having an axial dimension slightly less than the spacing of said planar surfaces, provided with a set of annular flanges received in said recessed end surfaces in said opening.

2. The sleeve according to claim 1 wherein the thickness of said annular member in the range of 0.5 mm to 3.0 mm.

3. The sleeve according to claim 1 wherein the spacing between the plane of an end of said annular member and the plane of the adjacent face of said disk is in the range of 0.1 mm to 0.5 mm.

4. The sleeve according to claim 1 wherein said annular member is formed of a material selected from a group consisting of steel, brass, aluminum and titanium.

5. The sleeve according to claim 1 wherein opposed sides of said flanges are beveled.

6. The sleeve according to claim 5 wherein the angle of each of said bevels is in the range of 30° to 42°.

* * * * *